United States Patent
Hamlin et al.

(10) Patent No.: US 11,068,614 B2
(45) Date of Patent: Jul. 20, 2021

(54) SYSTEM-LEVEL DATA SECURITY BASED ON ENVIRONMENTAL PROPERTIES

(71) Applicant: Dell Products, L.P., Round Rock, TX (US)

(72) Inventors: Daniel L. Hamlin, Round Rock, TX (US); Minhaj Ahmed, Allen, TX (US)

(73) Assignee: Dell Products, L.P., Round Rock, TX (US)

( * ) Notice: Subject to any disclaimer, the term of this patent is extended or adjusted under 35 U.S.C. 154(b) by 222 days.

(21) Appl. No.: 16/117,671

(22) Filed: Aug. 30, 2018

(65) Prior Publication Data

US 2020/0074097 A1   Mar. 5, 2020

(51) Int. Cl.
| | |
|---|---|
| *G06F 21/62* | (2013.01) |
| *G06F 21/60* | (2013.01) |
| *G06F 9/54* | (2006.01) |
| *H04L 29/08* | (2006.01) |

(Continued)

(52) U.S. Cl.
CPC .......... *G06F 21/6218* (2013.01); *G06F 9/545* (2013.01); *G06F 21/575* (2013.01); *G06F 21/604* (2013.01); *H04L 63/20* (2013.01); *H04L 67/2819* (2013.01)

(58) Field of Classification Search
CPC .. G06F 21/6218; G06F 21/575; G06F 21/604; G06F 9/545; H04L 63/20; H04L 67/2819
See application file for complete search history.

(56) References Cited

U.S. PATENT DOCUMENTS

| | | | |
|---|---|---|---|
| 2005/0091214 A1* | 4/2005 | Probert | G06F 21/6218 |
| 2011/0022812 A1* | 1/2011 | van der Linden | H04L 67/1097 |
| | | | 711/163 |

(Continued)

OTHER PUBLICATIONS

G. Sala • D. Sgandurra • F. Baiardi; Security and Integrity of a Distributed File Storage in a Virtual Environment; Fourth International IEEE Security in Storage Workshop (pp. 58-69); (Year: 2007).*

(Continued)

*Primary Examiner* — Luu T Pham
*Assistant Examiner* — Chao Wang
(74) *Attorney, Agent, or Firm* — Fogarty LLP

(57) ABSTRACT

Data is frequently protected by securing the data within containers that are only accessible using a specific security application. Once such data is transferred, all protections provided by the security application are lost. Methods and systems provide secured access to data by intercepting requests for access to a data files accessed via an IHS (Information Handling System) by applications operating within the operating system of the IHS. Based on condition settings stored in the data files, access privileges are determined for applications. The conditions settings include environmental conditions required for providing access to the data. If the IHS satisfies the environmental conditions specified by a data file, access to the data file may be granted. The data requests may be intercepted by a kernel process of the operating system of the IHS. The environmental conditions may specify requirements on the networks, display devices and/or software utilized by the IHS.

17 Claims, 4 Drawing Sheets

(51) Int. Cl.
*H04L 29/06* (2006.01)
*G06F 21/57* (2013.01)

(56) References Cited

U.S. PATENT DOCUMENTS

| | | | | |
|---|---|---|---|---|
| 2011/0087872 A1* | 4/2011 | Shah | G06F 21/554 | 713/2 |
| 2011/0219451 A1* | 9/2011 | McDougal | H04L 63/1416 | 726/23 |
| 2013/0061320 A1* | 3/2013 | Austin | G06F 21/6218 | 726/20 |
| 2014/0310770 A1* | 10/2014 | Mahaffey | H04L 63/1433 | 726/1 |
| 2015/0089102 A1* | 3/2015 | Kumar | G06F 13/24 | 710/262 |
| 2015/0220737 A1* | 8/2015 | Rothman | G06F 21/604 | 726/1 |
| 2016/0283404 A1* | 9/2016 | Xing | G06F 12/1009 | |
| 2018/0314845 A1* | 11/2018 | Anderson | G06F 21/604 | |

OTHER PUBLICATIONS

R.K. Shyamasundar • N.V. Narendra Kumar • Abhijit Taware • Parjanya Vyas; An Experimental Flow Secure File System; 2018 17th IEEE International Conference on Trust, Security and Privacy in Computing and Communications; (Year: 2018).*

Kodeswaran, P. • Nandakumar, V. • Kapoor, S. • Kamaraju, P. • Joshi, A. • Mukherjea, S.; Securing Enterprise Data on Smartphones Using Run Time Information Flow Control; 2012 IEEE 13th International Conference on Mobile Data Management (pp. 300-305); (Year: 2012).*

* cited by examiner

SYSTEM-LEVEL DATA SECURITY BASED ON ENVIRONMENTAL PROPERTIES

FIELD

This disclosure relates generally to data security, and more specifically, to data security supported by Information Handling Systems (IHSs).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A fundamental operation of an IHS is providing a user with access to data that may be stored either locally by the IHS, or remotely by one or more other IHSs, such as in a cloud implementation. In scenarios where access to data is secured, a user is typically provided with secured access to the data via a secured software application. In many such scenarios, the secured software application may utilize a specific application container for storing and controlling access to data. In such data security systems, the user is unable to access the data without use of a software application that is compatible with the specific type of application container used to store the data.

Each software application providing data security may utilize its own application container and its own unique security policies for providing access to the types of data defined by these containers. The resulting patchwork of data security solutions results in data security being provided within multiple different silos, each providing isolated access to certain data and each requiring use of specific software applications. The transfer of data security information between such systems that is required for interoperation between such applications is complicated by the proprietary nature of security software applications, each of which provides its own capabilities and limitations. Reliance on containers that are specific to specific applications serves to additionally limit the portability of data since data stored using different application containers cannot be transferred between two IHSs that utilize different types of application containers while still enforcing the same exact security protocols on both IHSs.

A consequence of the incompatible nature of different security applications is that the transfer of data outside of a security system often results in a complete loss of control over the data. Even for information with a distinct ownership interest, such as personal information or financial information, an owner of the information is unable to enforce any restrictions on access or use of the data if it is transferred to a different system. This situation results in limited scalability for data security solutions and results in burdensome restrictions on the software applications that are available to users.

SUMMARY

In various embodiments, an Information Handling System (IHS) is configured to support data security based on environmental properties. The IHS includes: one or more processors; a data storage device storing a plurality of data files, wherein the data files comprise condition settings for accessing data stored in the respective data files, wherein the plurality of conditions settings specify a plurality of environmental conditions required for providing access to the data stored in the respective data files; and a memory device coupled to the one or more processors, the memory device storing computer-readable instructions that, upon execution by the one or more processors, cause the IHS to: intercept a request for access to a first data file of the plurality of data files stored on the data storage device, wherein the request is issued by an application operating within the operating system of the IHS; determine whether the IHS satisfies the environmental conditions required for accessing the data in the data file; and provide access to the data stored in the data file if the IHS satisfies the environmental conditions.

In certain additional embodiments of the IHS, the request is intercepted by a protected kernel process of the operating system of the IHS. In certain additional embodiments of the IHS, the environmental conditions required for providing access to the data comprise requiring a specific version of the protected kernel process. In certain additional embodiments of the IHS, the environmental conditions required for providing access to the data comprise requiring the IHS to be coupled to specific type of network. In certain additional embodiments of the IHS, the environmental conditions required for providing access to the data comprise requiring a specific security application to be running in the operating system of the IHS.

In various additional embodiments, a method provides secured access to data via an Information Handling System (IHS). The method includes: intercepting a request for access to a data file accessed via the IHS, wherein the request is issued by an application operating within the operating system of the IHS; determining a plurality of conditions for accessing the data file by querying the data file to retrieve condition settings for accessing the data stored in the data file, wherein the plurality of conditions settings specify a plurality of environmental conditions required for providing access to the data; determining whether the IHS satisfies the environmental conditions required for accessing the data in the data file; and providing access to the data stored in the data file if the IHS satisfies the environmental conditions.

In certain additional method embodiments, the request is intercepted by a kernel process of the operating system of the IHS. In certain additional method embodiments, the kernel process is secured during pre-boot initialization of the IHS. In certain additional method embodiments, the environmental conditions required for providing access to the data comprise requiring a specific version of the secured kernel process to be running. In certain additional method embodiments, the environmental conditions required for providing access to the data comprise requiring the IHS to be coupled to specific type of network. In certain additional method embodiments, the environmental conditions required for providing access to the data comprise requiring a specific security application to be running in the operating system of the IHS. In certain additional method embodiments, the environmental conditions required for providing access to the data comprise requiring the IHS to be configured for the use of a single display device.

In various additional embodiments, a system includes a first IHS (Information Handling System) and a second IHS. The first IHS configured to: intercept a request for access to a data file stored by the first IHS, wherein the request is issued by an application operating within the operating system of the first IHS; provide access to data stored in the data file if the first IHS satisfies a plurality of environmental conditions for accessing the data file by querying the data file to retrieve condition settings for accessing the data stored in the data file, wherein the plurality of retrieved conditions settings specify the plurality of environmental conditions required for providing access to the data; and transmit the data file to the second IHS. The second IHS configured to: store the data file transmitted by the first IHS; intercept a request for access to a data file stored by the second IHS, wherein the request is issued by an application operating within the operating system of the second IHS; and provide access to data stored in the data file if the second IHS satisfies the plurality of environmental conditions for accessing the data file by querying the data file to retrieve the condition settings for accessing the data stored in the data file, wherein the plurality of retrieved conditions settings specify the plurality of environmental conditions required for providing access to the data.

In certain additional system embodiments, the request is intercepted by the first IHS by a kernel process of the operating system of the first IHS and wherein the request is intercepted by the second IHS by a kernel process of the operating system of the second IHS. In certain additional system embodiments, the kernel process running on the first IHS is secured during pre-boot initialization of the first IHS, and wherein the kernel process running on the second IHS is secured during pre-boot initialization of the second IHS. In certain additional system embodiments, the environmental conditions required for providing access to the data comprise requiring a specific version of the protected kernel process to be running. In certain additional system embodiments, the specific version of the kernel process running on the first IHS is determined during the pre-boot initialization of the first IHS. In certain additional system embodiments, the specific version of the kernel process running on the second IHS is determined during the pre-boot initialization of the second IHS. In certain additional system embodiments, the environmental conditions required for providing access to the data via the first IHS comprise requiring the first IHS to be coupled to a specific network, and wherein the environmental conditions required for providing access to the data via the second IHS comprise requiring the second IHS to be coupled to the specific network. In certain additional system embodiments, the environmental conditions required for providing access to the data via the first IHS comprise requiring a specific anti-virus application to be running in the operating system of the first IHS, and wherein the environmental conditions required for providing access to the data via the second IHS comprise requiring the specific anti-virus application to be running in the operating system of the second IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
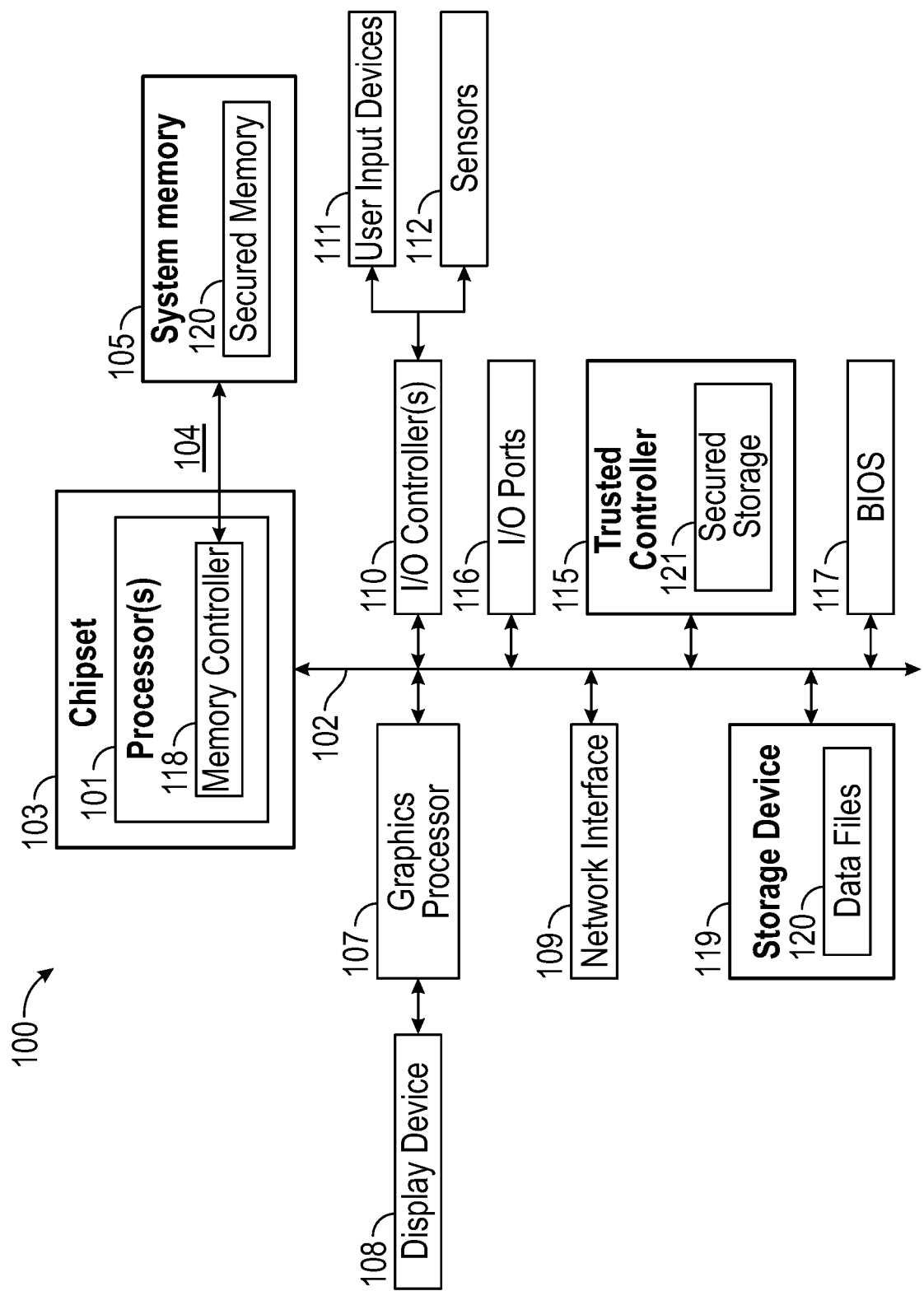
FIG. 1 is a block diagram depicting certain components of an IHS configured according to various embodiments for providing system-level data security based on environmental properties.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an personal or enterprise computer, other embodiments may be utilized.

FIG. 1 is a block diagram of an IHS 100 configured according to certain embodiments to support system-level, data security based on environmental properties. In various embodiments, IHS 100 may execute program instructions that cause IHS 100 to perform certain of the operations disclosed herein. While a single IHS 100 is illustrated in FIG. 1, IHS 100 may be a component of an enterprise datacenter system that may include any number of additional IHSs that may also be configured as participant nodes in the same or similar manner to IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

In certain embodiments, system memory 105 includes a secured memory 120 that may be a portion of the system memory designated for used by secured processes. In certain of such embodiments, the execution of a kernel of the operating system used by IHS 100 may be restricted to operation within secured memory 120. In certain embodiments, specific kernel processes may be additionally or separately restricted to operation within secured memory area. For instance, the secured kernel process for intercepting and managing certain access to data described with regard the embodiments of FIGS. 2-4 may be restricted to operation within a secured memory area 120 that has been designated for secured kernel operations.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, the network interface 109 may be coupled to the chipset 103 via a PCIe bus.

In certain embodiments, the network interface 109 may be configured to respond to queries for network information from a protected kernel process operating within the operating system of IHS 100. Such network information provided by the network interface 109 may specify all active and/or recently active network connections between the IHS 100 and an external network or to another IHS, such as via a peer-to-peer short-range wireless connection. The network connections reported by the network interface 109 in response to such queries may include both wired and wireless connections.

Chipset 103 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, graphics processor 107 may be configured to respond to queries for display information from a protected kernel process operating within operating system of the IHS 100. The display information provided by the graphics processor 107 may identify each of the various displays by which the IHS is currently displaying information. For instance, graphics processor 107 may indicate that display device 108 is actually comprised of multiple displays. The display information provided via graphics processor 107 may also indicate that the IHS is currently coupled to a projection system. The display information may also indicate that display features such as screen mirroring or screen sharing are currently in use by IHS.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. The user input devices may interface with the I/O controller 110 through wired or wireless connections.

Sensors 112 accessed via I/O controllers 110 may provide access to data describing environmental and operating conditions of IHS 100. In certain embodiments, sensors 112 may include geo-location sensors capable for providing a geographic location for IHS 100, such as a GPS sensor and sensors configured to determine location based on triangulation and network information. In certain embodiments, such location sensors may be configured to respond to queries from a protected kernel process such as described herein.

Other components of IHS 100 may include one or more I/O ports 116 for communicating with peripheral external devices as well as various input and output devices. For instance, I/O 116 ports may include USB (Universal Serial Bus) ports, by which a variety of external devices may be coupled to IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109. As described in additional detail with regard to the below embodiments, the storage device 119 may be used to store data files 120 for which system-level data security may be provided.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, a trusted controller 115 is coupled to IHS 100. In certain embodiments, the trusted controller 115 may an embedded controller configured as a Trusted Platform Module that is capable of verifying the integrity of hardware and software components of IHS 100, including certain processes, during pre-boot initialization of the IHS 100 (i.e., prior to booting the operating system of the IHS 100). Trusted controller 115 may calculate signatures that uniquely identify individual components of IHS 100, including software executables run by IHS 100. For instance, a reference signature for a process, such as the protected kernel process described herein, may be generated based on certain of the files from which the process is configured and launched, such as libraries, binaries and configuration files. Such a hash value may be maintained in the secure storage 121 as a reference signature used for validating the integrity of a signature presented via interrogation of a process purporting to be a protected kernel process described herein. Such a hash value may be utilized as a reference signature that identifies a specific version of the protected kernel process. In certain instances, this specific version is a specific instance of the protected kernel process, as identified by the reference signature calculated during pre-boot initialization of the operating system, an hence the protected kernel process, of the IHS.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
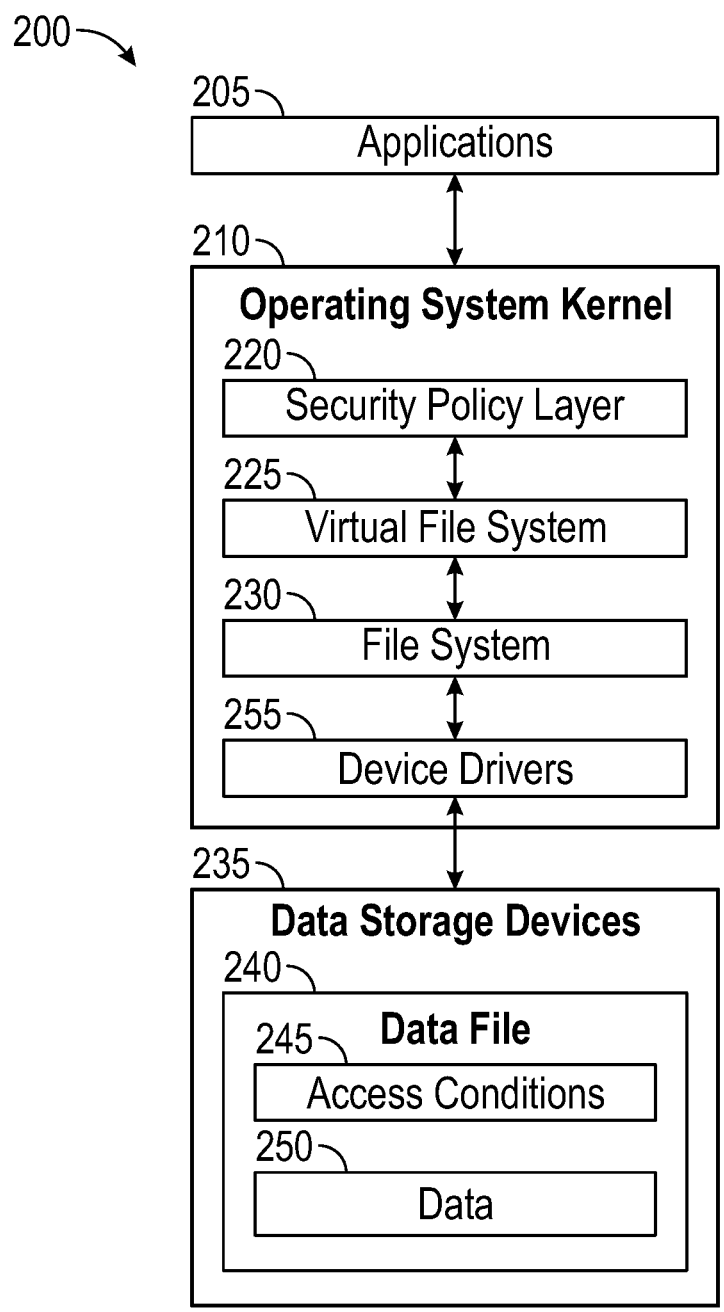
FIG. 2 is a block diagram depicting a system for providing system-level data security based on environmental properties according to various embodiments.

FIG. 2 is a block diagram depicting a system for providing system-level data security based on environmental properties according to various embodiments. In the illustrated embodiment, the data 250 that is secured is stored in data files 240 in one or more data storage devices 235. In certain embodiments, the data files 240 may be stored on a single storage device 235, such as a magnetic or solid-state storage drive used by a personal computing device. In other embodiments, the data files 240 may be distributed among several distinct storage devices 235 that are accessed either locally or remotely by the IHS from which a request for data 250 is generated via the operation of software applications 205 running within the operating system of the IHS.

In certain embodiments, the storage devices 235 may be formatted for use with a filesystem 230 that is compatible with the described data files 240. In particular, the filesystem 230 may support the access conditions 245 specified by the data files 240 stored by the storage devices 235, including environmental access conditions that specify operating state requirements for the IHS in order to access data 250 stored in the data file 240. As illustrated, the filesystem 230 used to access the data files 240 is a component of the kernel 210 of the operating system of the IHS. As described, the operating system kernel 210 may be configured to intercept all requests to access data 250 stored by the data storage devices 235. In particular, the operating system kernel 210 may intercept such requests generated via use of software applications 205 running within the operating system of the IHS. Such software applications 205 may include applications that are integral to the operating system as well as third-party applications installed by the user.

As illustrated, the operating system kernel 210 may be comprised of multiple logical layers that interoperate to provide access to data 250 stored in the data storage devices 235. For instance, the kernel 210 may include a security policy layer 220 that may be configured to broker data access requests by applications 205 and to enforce the access conditions 245 associated with data 250 that is provided to the user via the applications 205. Upon receipt and authentication of a data access request received from an application 205, the security policy layer 220 may request access to the stored location of the requested data via a virtual filesystem 225 that provides the operating system and the applications 205 running therein with a logical file structure that abstracts the actual storage of the data 250 on the data storage device 235.

The virtual filesystem 225 may utilize the filesystem 230 that is compatible with the formatting of the data storage device 235 in order to obtain the actual storage location of the data file 240. As described with regard to FIG. 3, the filesystem 230 may interoperate with the storage devices 235 via a stack of device drivers 255 that provide abstraction layers for communicating with the storage devices 235. In certain embodiments, the data access requests may be intercepted by the kernel 210 via modifications to the device drivers 255 used by the IHS to operate the data storage devices 235.

In certain embodiments, the filesystem 230 may be configured to query the access conditions 245 for a data file 240 in response to a request for accessing the data 250 stored in the data file 240. In such embodiments, the filesystem 230 may retrieve the access conditions 245, which may include environmental access conditions. The access conditions 245 may then be evaluated by the kernel 210 in order to determine whether to grant the requested access to the data 250. For instance, as described with regard to the below embodiments, the kernel 210 may evaluate the environmental access conditions by querying various components of the IHS in order to determine whether the current operating state of the IHS satisfies the access conditions 245 for accessing the data 250. If the environmental access conditions 245 are satisfied by the operating state of the IHS, access to the data 250 may be provided to the application 205 according to the access conditions 245 enforced by the security policy layer 220.

Figure 3:
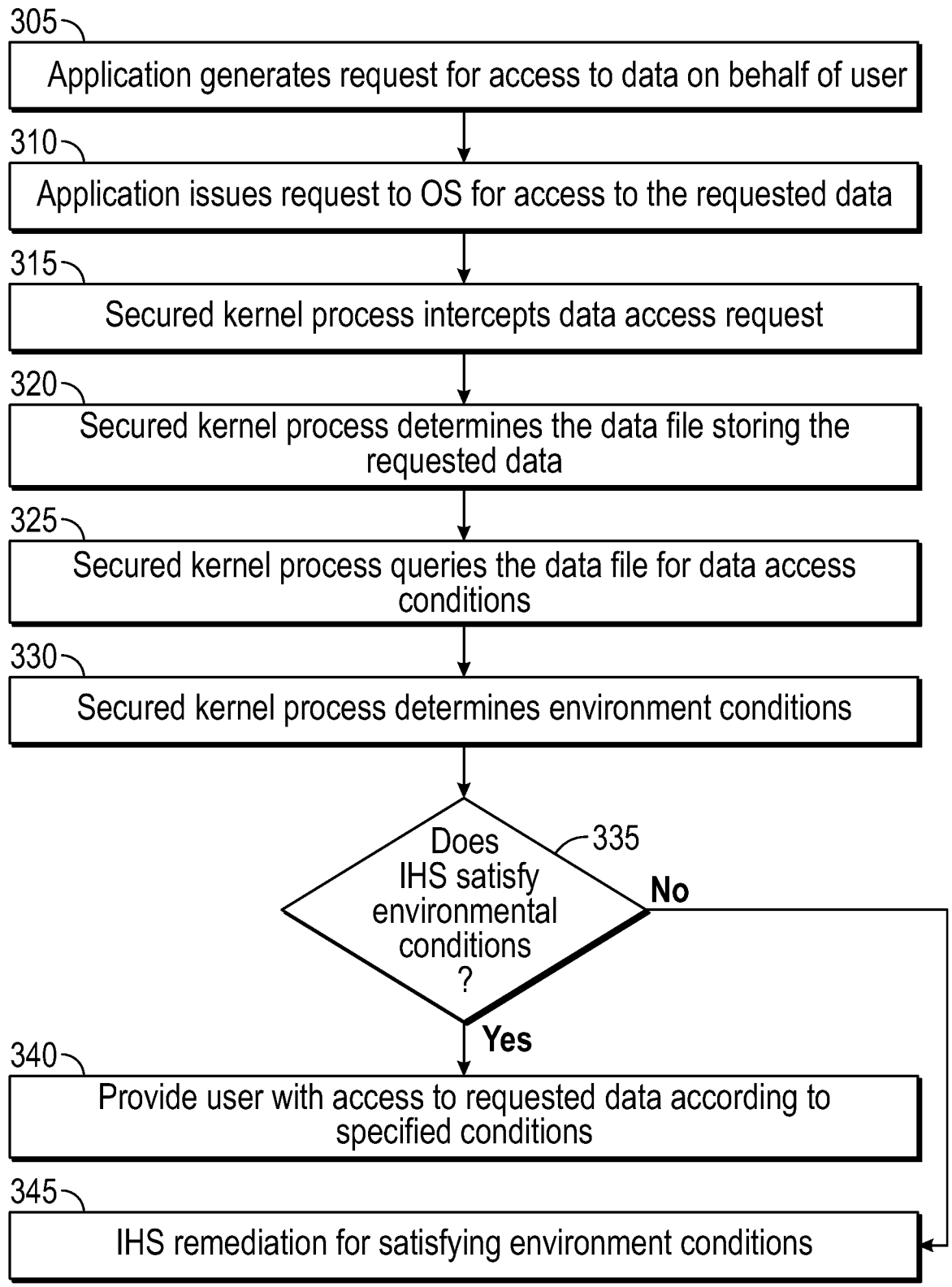
FIG. 3 is a flow chart illustrating certain steps of a process according to certain embodiments for providing system-level data security based on environmental properties.

FIG. 3 illustrates certain steps of a process according to certain embodiments for providing system-level data security based on environmental properties of the IHS requesting access to secured data. The illustrated embodiment begins at step 305 with a software application running on an IHS generating a request for access to data stored in a location that is accessible by the IHS. In certain embodiments, the software application may generate such a request on behalf of a user of the IHS.

As described, the IHS may support a wide variety of software applications by which a user may request access to stored data. Such software applications may be integral components of the operating system of the IHS, such as file system graphical browser user interface or a command line interface. Software applications may also be optional components of the operating system of the IHS, such as a spreadsheet, email, or word processing application. Software applications may also be optional third-party components supported by the operating system of the IHS, such as web browsers, games, and multimedia applications.

At step 310, the software application issues the data access request via the operating system of the IHS. A request to access data stored within a file may be a request to read the data (e.g., to view the data via the software application used to issue the request) or to modify the data (e.g., to use the software application in order to change or delete data). The request to access data may be issued in direct response to a request from a user of the IHS, such as a user seeking to open a file using a spreadsheet application or a user action within a web browser application that results in a database query. The request to access data may also be issued by a software application as part of its operations that are not directly user driven, such as a web application periodically collecting user information and transmitting it to a remote server.

The operation of an IHS according to embodiments includes an operating system that includes a protected kernel that, among other operations, manages input and output requests made by all software applications running within the operating system. At step 315, the protected kernel includes one or more processes that intercept such input and output requests made via the operating system. In certain embodiments, the protected kernel intercepts all such input and output requests made via the operating system and determines those requests for access to stored data that is secured according the embodiments described herein.

In certain embodiments, all requests for access to stored data may be intercepted regardless of the location of the stored data. In other embodiments, only requests for data stored in a specific location may be intercepted, where this specific storage location may include a protected memory region, a specific memory device, a trusted microcontroller storage, a specific filesystem, or a specific data repository. In such embodiments, these storage locations may be configured to store data files such as those described herein that specify conditions for access to the data stored therein.

In certain embodiments, the kernel may utilize an intercept process to intercept requests by the software applications running within the operating system for data stored on a specific device. In certain embodiments, the data intercept process may be implemented within the driver stack by which the operating system accesses a storage device that stores data files that operate using the described access conditions, such as a storage device that is formatted using a filesystem that is configured to operate using the described data file access conditions. For instance, in a scenario where a storage device, such as a solid-state drive, is formatted using a compatible file system, requests for access to data files stored by such storage devices may be intercepted through modification of one or more of the drivers that are used by the kernel to interface with the storage device.

At step 320, the data intercept process running within the kernel identifies the data file storing the requested data. As described with regard to FIG. 2, the data intercept process may rely on the virtual filesystem and/or filesystem of the IHS in the identification of the actual storage location of the file storing the requested data. At step 330, the data intercept process queries the identified data file in order to obtain the access conditions which have been set forth for the data stored within the file. In certain embodiments, the filesystem storing the data file may be utilized to query the file and to identify the access conditions that are applicable to a specific data file. In certain embodiments, the access conditions may be specified in the form of an access control list that specifies access rights with regard to the data stored in a particular file.

In certain embodiments, an access control list may specify specific users that are allowed to access the data stored within a file. For instance, an access control list may specify access rights for one or more SIDs (security identifiers) that uniquely identify individual users or groups. The access control list may also specify specific types of access rights for a file. For instance, an access control list for a file may specify that the file data is read-only for all users, with no exceptions. In certain scenarios, an access control list may specify lists of users or groups that have certain access rights with respect to a specific file. In certain embodiments, an access control list may identify specific applications that may have certain access rights with respect to a file. In certain additional embodiments, an access control list may specify a limit on the number of times the data within the file may be accessed without obtaining additional authorization from an owner of the file.

As described, various environmental conditions for providing access to data file may also be specified within the access conditions associated with a stored data file. Various such environmental conditions, such as specific security requirements, have been provided throughout as illustrative examples. Such environmental conditions may be stored and associated with specific files in the same manner as an access control list. At step 330, the secured kernel process queries the data file and determines any such environmental conditions that have been defined for the data file. As with an access control list, the secured kernel process may rely on the filesystem to query the actual file in order to obtain any environmental conditions that have been specified for that file.

At step 340, the secured kernel process determines whether the IHS satisfies the environmental conditions set forth for accessing the data file. For instance, in response to an environmental condition requiring the requesting IHS to utilize virus protection, the secured kernel process may verify that a recognized antivirus process is currently being run by the operating system of the IHS. The environmental condition may also specify a specific version of a virus protection application, in which case the secured kernel process may verify that the specific version is currently being run by the operating system. In a similar manner, the environmental conditions for a file may also require use of a specific version of an operating system and/or require a specific set of updates to be in use by the operating system.

In another example, an environmental condition for access to a file may specify various restrictions with regard to the networks to which the IHS may be connected while accessing the data. For instance, conditions for accessing a data file may require the IHS to be connected to a specific network, such as a specific LAN (Local Area Network). The environmental conditional may also require a request be made via a specific type of network connection, such as via a specific VPN (Virtual Private Network). In certain scenarios, the secured kernel process may query various IHS resources, such as network interface 109 of FIG. 1, in order to determine the various networks to which the IHS is connected. Via the operating system, the secured kernel process may also query the application requesting access to the data in order to determine whether the request is being made via a secured network connection, such as via a VPN. In other scenarios, the network connection restrictions specified by the environmental conditions may deny access to stored data if the IHS is connected to any public or other unrecognized network, via any type of wired or wireless connection to an external network or directly to another device.

In certain embodiments, the environmental conditions may include specific physical locations within which access to the stored data file may be provided. For instance, the environmental conditions may specify a range of geographic coordinates corresponding to a secured location, such as a corporate campus or research facility, within which access to data may be available. In such embodiments, the secured kernel process may query the operating system, the network interface and/or geolocation sensors supported by the IHS in order to determine the location of IHS.

In certain embodiments, the environmental conditions may specify restrictions on the display of the data by the IHS. For instance, certain sensitive data may be restricted to be displayed via a single, integral display device of an IHS. Accordingly, access to such data may be provided only upon verification that the IHS is not currently utilizing multiple displays, and/or is not otherwise utilizing an external display, such as via a projection system. In such embodiments, the secured kernel process may query components such as graphics processor 107 of FIG. 1, the operating system, and display controllers utilized by the IHS in order to determine the display devices that are currently being used by the IHS.

In certain embodiments, the environmental conditions set forth for a data file may also include requirements pertaining to the secured kernel process itself. For instance, the data file may include conditions that require use of a specific version of the secured kernel process. The data file may also specify access conditions that require the secured kernel process to be validated and secured by a trusted controller that is utilized by the IHS, such as trusted controller 115 of FIG. 1. As described, in certain embodiments, trusted controller may calculate a signature corresponding to the secured kernel process, in certain instances, during pre-boot initialization of the IHS. In such embodiments, the access conditions for a data file may require the secured kernel process to present this exact signature in order to obtain access to the data secured within the file, thus requiring the IHS to be running a specific version or instance of the secured kernel process.

If the IHS satisfies each of the environmental conditions required for accessing a requested data file, at step 340, the user is granted access to the file data according to the access conditions for that file. If, however the IHS does not satisfy each of the environmental conditions, at step 345, the IHS may be directed to remediation procedures that may allow IHS to become eligible for access to the file data. For instance, in scenarios where the IHS is denied access to file data due to connections to certain networks, the user may be provided with a capability for authorizing the IHS to disconnect from all networks except those authorized within the environmental conditions associated with data file. In another scenario, the remediation procedures may direct the user to resources for upgrading certain security applications, such as antivirus software and security upgrades available via the operating system. In another scenario, the remediation procedures may provide the user with the capability to authorize disconnecting the IHS from all but one display device, where the one display device must be the integrated display of the IHS, if the IHS includes an integral display.

Figure 4:
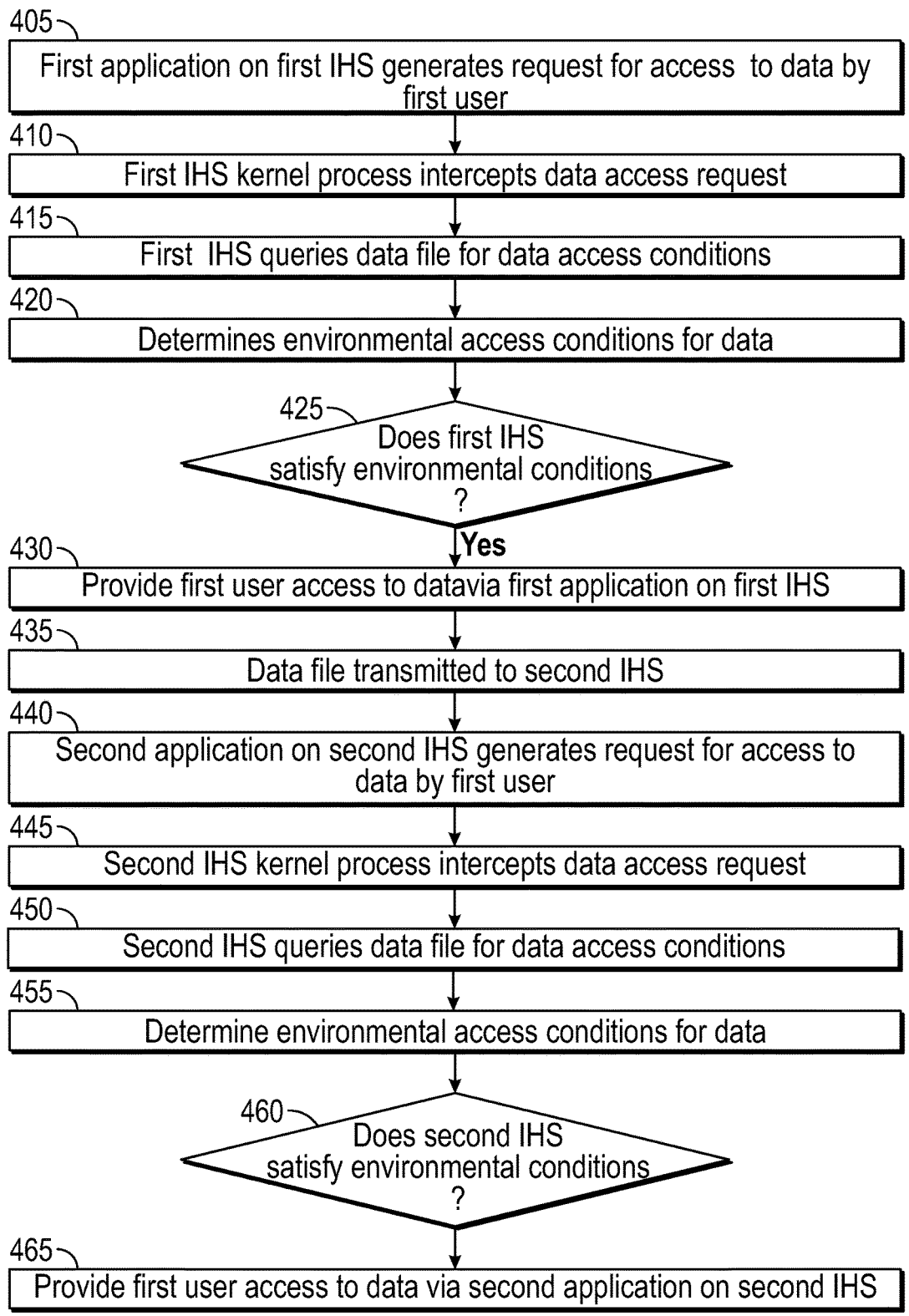
FIG. 4 is a flow chart illustrating certain steps of a process according to certain embodiments for providing system-level data security based on environmental properties via multiple IHSs.

FIG. 4 is a flow chart illustrating certain steps of a process according to certain embodiments for providing system-level data security via multiple IHSs based on environmental properties of the individual IHSs. As described, data security protocols that are specific to applications and to application containers provide limited scalability. Once data is transferred to a different system, the security measures provided by the application and application container are no longer applicable. In order to avoid such security gaps, users are limited to the use of specific applications, each of which implementing its own security measures via the operations supported by the secured application containers. The embodiment of FIG. 4 illustrates the ability of embodiments to support transfer of data between IHSs while maintaining data security and without requiring the use of specific security software applications or containers.

In the illustrated embodiment, the process begins at step 405 with a first IHS receiving a request for access to data from a first software application running within the operating system of the first IHS. As with the embodiment of FIG. 3, the software applications that may issue a data request may be any type of application running within the operating system of the IHS, including third-party applications and applications integrated within the operating system. In certain embodiments, a data access request generated by a software application may uniquely identify the user of the application, such as via an SID.

At step 410, a kernel process of the operating system of the first IHS intercepts data requests issued via the operating system, as described with regard to the embodiment of FIG. 3. The kernel process of the first IHS may intercept all data access requests, or only certain access requests that request access to data stored in specific storage locations. At step 415, the first IHS identifies and queries the file storing the data in order to determine any conditions that have been specified for accessing the data.

As described, access conditions specified by a data file may include environmental conditions that require certain security measures to be implemented by the IHS requesting access to the stored data. At step 420, any such environmental conditions for a data file are identified and the kernel process queries various components of the first IHS in order to determine, at step 425, whether the first IHS satisfies the environmental conditions set forth in the data file. If the first IHS is determined to satisfy each of the environmental conditions associated with the data file and the first user is authorized to access data, such as based on the SID specified in the access conditions, at step 430, the first user is provided access to the data according to the restrictions specified by the access conditions.

In the illustrated embodiment, the first user may choose to continue accessing the same data file via a different, second IHS. Accordingly, at step 435, the data file is transmitted from the first IHS to a second IHS. Upon the data file being received and stored by the second IHS, at step 440, the user requests access to the data file via a second application running within operating system of the second IHS. As with the first application utilized via the first IHS, the second application may be any type of application running within the operating system of the second IHS. At step 445, the kernel process of the operating system of the second IHS intercepts certain input and output requests made by applications to the operating system, including the request to access the data file. At step 450, the kernel process queries the data file, now stored by the second IHS, in order to determine the conditions for providing access to the data stored in the file.

Any environmental conditions specified for the data file are identified within the access conditions at step 455. These environmental conditions are evaluated at step 450 based on various queries by the kernel process of the second IHS in order to determine, at step 460, whether the current operating state of the second IHS satisfies each of the conditions. If the second IHS satisfies the environmental conditions and the first user is still authorized to access the data file, at step 465, the first user is provided access to the file data via the second IHS. In this manner, access to the data file is provided to the user via a different IHSs without requiring the use of the same software application or application container on both of the IHSs and while still ensuring the environmental conditions for providing secure access to data are satisfied by both of the IHSs.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) configured to support data security based on environmental properties, the IHS comprising:
   one or more processors;
   a data storage device storing a plurality of data files, wherein each of the data files comprise access conditions that are part of a respective data file and that specify a plurality of environmental conditions required for providing access to data stored in the respective data file, wherein the environment conditions specify one or more software applications other than a requesting software application that must be running on the IHS in order to access the data stored in the respective data file; and
   a memory device coupled to the one or more processors, the memory device storing computer-readable instructions that, upon execution by the one or more processors, cause the IHS to:
   intercept a request from the requesting software application for access to a first data file of the plurality of data files stored on the data storage device, wherein the request from the requesting software application is intercepted by a protected kernel process;
   determine whether the environmental conditions required for accessing the data in the first data file are satisfied, wherein the environment conditions are specified in the access conditions that are part of the first data file, wherein the environmental conditions required for providing access to the data of the respective data file specify a specific version of the protected kernel process that must be utilized in order to access the data stored in the respective data file; and
   provide the requesting software application with access to the data stored in the first data file, when the software applications other than the requesting software application are confirmed as running on the IHS.

2. The IHS of claim 1, wherein the data storage device is formatted using a file system that provides access to the plurality of data files and that queries the access conditions that are part of each of the data files in order to determine whether the environmental conditions required for accessing the data in each data file are satisfied.

3. The IHS of claim 1, wherein the environmental conditions required for providing access to the data stored in the respective data file specify a type of network that must be used by the requesting software application in order to access the data stored in the respective data file.

4. The IHS of claim 1, wherein the one or more software applications other than a requesting software application that must be running on the IHS in order to access the data stored in the respective data file comprise a specific security application that must be running on the IHS.

5. A method for providing secured access to data via an Information Handling System (IHS), the method comprising:
intercepting a request from the requesting software application for access to a data file accessed via the IHS, wherein the request is intercepted by a kernel process of the IHS;
determining a plurality of conditions for accessing data of the data file by querying access conditions that are part of the data file that specify a plurality of environmental conditions required for providing access to the data stored in the data file, wherein the environment conditions specify one or more software applications other than the requesting software application that must be running on the IHS in order to access the data stored in the data file, wherein the environmental conditions required for providing access to the data file comprise requiring a specific version of the kernel process to be used in order to access the data file;
determining whether the environmental conditions required for accessing the data in the data file are satisfied, wherein the environment conditions are specified in the access conditions that are part of the data file; and
providing the requesting software application with access to the data stored in the data file, when the software applications other than the requesting software application are confirmed as running on the IHS.

6. The method of claim 5, wherein the data file is stored in a data storage device that is formatted using a file system that provides access to the plurality of data files and that queries the access conditions that are part of each data file in order to determine whether the environmental conditions required for accessing the data in each data file are satisfied.

7. The method of claim 5, wherein the version of the kernel process is determined based on a signature calculated from a plurality of files that comprise the kernel process.

8. The method of claim 5, wherein the environmental conditions required for providing access to the data of the data file specify a type of network that must be used by the requesting software application in order to access the data of the data file.

9. The method of claim 5, wherein the one or more software applications other than a requesting software application that must be running on the IHS in order to access the data stored in the respective data file comprise a specific security application that must be running on the IHS.

10. The method of claim 5, wherein the environmental conditions required for providing access to the data stored in the data file further comprise conditions requiring the IHS use a single display device.

11. A computer-readable storage device having instructions stored thereon for providing secured access to data stored by an a first IHS (Information Handling System), wherein execution of the instructions by one or more processors of the first IHS causes the one or more processors to:
intercept a request from the requesting software application for access to a data file stored by a data storage device of the first IHS, wherein the request is intercepted by a kernel process running on the first IHS;
determine a plurality of environmental conditions for accessing data stored in the data file by querying access conditions that are part of the data file that specify one or more software applications other than the requesting software application that must be running on the IHS in order to access the data stored in the data file, wherein the environmental conditions required for providing access to the data file comprise requiring a specific version of the kernel process to be used in order to access the data file;
when the environmental conditions specified in the access conditions that are part of the data file are not satisfied, determine remediation procedures that will result in the environmental conditions being satisfied; and
present the remediation procedures to a user of the first IHS, wherein the remediation procedures comprise initiating the one or more software applications other than the requesting software application that must be running on the IHS in order to access the data stored in the data file.

12. The computer-readable storage device of claim 11, wherein the data storage device is formatted using a file system that provides access to the plurality of data files and that queries the access conditions that are part of each file in order to determine whether the environmental conditions required for accessing the data in the data files are satisfied.

13. The computer-readable storage device of claim 11, wherein the version of the kernel process is determined based on a signature calculated from a plurality of files that comprise the kernel process.

14. The computer-readable storage device of claim 11, wherein the environmental conditions required for providing access to the data file specify a type of network that must be used by the requesting software application in order to access the first data file.

15. The computer-readable storage device of claim 12, wherein the request is intercepted by a driver used to interface with the data storage device that is formatted to query the access conditions that are part of the data files.

16. The computer-readable storage device of claim 11, wherein the environmental conditions required for providing access to the data stored in the data file further require the first IHS to utilize a single display device.

17. The computer-readable storage device of claim 11, wherein the one or more software applications other than a requesting software application that must be running on the first IHS in order to access the data stored in the respective data file comprise a specific anti-virus application that must running in the operating system of the first IHS.

* * * * *